United States Patent
Berntorp et al.

(10) Patent No.: US 10,093,321 B1
(45) Date of Patent: Oct. 9, 2018

(54) SYSTEM AND METHOD FOR CALIBRATING PARAMETERS OF TIRES

(71) Applicant: Mitsubishi Electric Research Laboratories, Inc., Cambridge, MA (US)

(72) Inventors: Karl Berntorp, Watertown, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 14 days.

(21) Appl. No.: 15/467,141

(22) Filed: Mar. 23, 2017

(51) Int. Cl.
*B60W 40/12* (2012.01)
*B60W 40/10* (2012.01)

(52) U.S. Cl.
CPC .......... *B60W 40/12* (2013.01); *B60W 40/10* (2013.01); *B60W 2400/00* (2013.01); *B60W 2520/26* (2013.01); *B60W 2520/28* (2013.01)

(58) Field of Classification Search
CPC .............................. B60W 40/12; B60W 40/10
See application file for complete search history.

(56) References Cited

U.S. PATENT DOCUMENTS 8,065,067 B2 * 11/2011 Svendenius ............. B60T 8/172
701/80

* cited by examiner

*Primary Examiner* — Basil T. Jos
(74) *Attorney, Agent, or Firm* — Gene Vinokur; James McAleenan; Hironori Tsukamoto

(57) ABSTRACT

A tire of a vehicle is calibrated based on a motion model of the vehicle relating control inputs to the vehicle with a state of the vehicle and a measurement model of the vehicle relating measurements of the motion of the vehicle with the state of the vehicle. The motion model of the vehicle includes a combination of a deterministic component of the motion and a probabilistic component of the motion, wherein the deterministic component of the motion is independent from the state of stiffness and defines the motion of the vehicle as a function of time. The probabilistic component of the motion includes the state of stiffness having an uncertainty and defining disturbance on the motion of the vehicle. The tire is calibrated based on motion data that include a sequence of control inputs to the vehicle that moves the vehicle according to the trajectory and a sequence of measurements of the motion of the vehicle moved along the trajectory by updating iteratively a probability distribution of the state of stiffness until a termination condition is met. An iteration determines a first state trajectory of the vehicle according to the motion model using the sequence of control inputs and one or multiple samples of the probability distribution of the state of stiffness, determines a second state trajectory of the vehicle according to the measurement model using the sequence of measurements, and updates the probability distribution of the state of stiffness to reduce an error between the first state trajectory of the vehicle and the second state trajectory of the vehicle.

15 Claims, 18 Drawing Sheets

SYSTEM AND METHOD FOR CALIBRATING PARAMETERS OF TIRES

TECHNICAL FIELD

This invention relates to tire-to-road interaction of a vehicle, and more specifically to calibrating parameters of tires of the vehicle.

BACKGROUND

The tire-to-road interaction is the dominating factor in generating, or changing, the motion of a wheeled vehicle, and the knowledge of variables related to the tire-to-road interaction is essential for many active safety systems in modern vehicles. Parameters related to the road friction are employed in many modern vehicles. For example, anti-lock braking systems (ABS), electronic stability control systems (ECS), and advanced driver-assistance systems (ADAS), all make extensible use of parameters related to the tire-to-road interaction, in order to provide advanced safety mechanisms.

An important parameter when determining the tire-to-road interaction is the friction coefficient. Knowledge of the friction coefficient can be used as a supervisory component to the driver, but it can also be utilized in, for example, ABS, ESC, and ADAS. Friction coefficient can be used directly in vehicle control systems, such as ADAS; can be used as a supervisory component to a driver, e.g., to alert the driver of abrupt changes in the road surface; can be used to classify the road surface on which the car is traveling.

Another parameter of the state of the stiffness of the tires is an initial slope of the force-slip curve. The tire stiffness is in general different in the forward and lateral direction, so there are in general two individual force-slip curves per wheel, possibly depending on each other. The tire stiffness can be used directly in vehicle control systems, such as ADAS; can be used as a supervisory component to a driver, e.g., to alert the driver of abrupt changes in the road surface; can be used to classify the road surface on which the car is traveling; and/or it can be used to determine the friction coefficient.

Thus, it is desirable to obtain knowledge about the friction and/or other parameters that can help determining the friction while driving. For example, one parameter relating to the forces generated by the tire-to-road contact is the slip. In a longitudinal case, i.e., in the wheel's forward direction, the slip is defined in terms of the difference of the longitudinal velocity and the rotational speed of the wheel normalized by either the rotational speed of the wheel or the longitudinal velocity, whichever one is greater, i.e., whether the wheel is accelerating or braking. In a lateral case, i.e., in the wheel's lateral direction, the slip is defined in terms of a ratio between the wheel's lateral and longitudinal velocity components.

However, the parameters related to the tire-road interaction, such as the peak friction coefficient, tire stiffness, and slip, is generally difficult to measure or sense directly during driving; hence, it is usually determined by using indirect friction determination methods, in combination with one or more sensors.

A number of methods aim to estimate the parameters of the tires using various optimization techniques. For example, the method described in U.S. Pat. No. 8,065,067 uses bins of collected data to approximate a nonlinear function and minimizing error of friction and tire stiffness using nonlinear optimization. However, the nonlinear optimization is known to be prone to lack of convergence or convergence in a local optimum.

In addition, all methods that aim to determine parameters of the tires during runtime are dependent on a good initial guess. Methods for calibrating the parameters of the tires are often based on high-precision sensor setups or test rigs. However, high-precision sensors are costly and test rigs are only an approximation of the real world, so that calibration of a particular tire will only be true for that particular test rig.

Accordingly, there is a need for a system and a method for calibrating parameters of tires of vehicle using sensors available in production vehicles.

SUMMARY

It is an object of some embodiments of the invention to provide a system for determining parameters of tires of a vehicle that describes the tire to road contact force relation. It is another object of some embodiments to provide such a method that is suitable for determining the state of the stiffness in using low-cost sensors that are available in standard passenger vehicles. As defined herein, the parameters of tires include at least one parameter defining an interaction of at least one tire of the vehicle with a road on which the vehicle is traveling. For example, the parameters can include one or combination of a longitudinal stiffness of the tire, a lateral stiffness of the tire, a friction between the tire and the road, a shape coefficient determining the shape of the tire to road contact force relation.

It is another object of some embodiments to determine the parameters of tires probabilistically and/or to estimate the confidence level of the determined parameters. For example, one embodiment uses the confidence level of the state of the stiffness to initialize a method for adjusting the calibrated parameters of the tires according to changes in road surface and tire pressure. As used herein, a vehicle can be any type of wheeled vehicle, such as a passenger car, bus, or rover.

Some embodiments are based on recognition that the motion of the vehicle is dependent on the parameters of the tires. To that end, it is tempting to estimate the parameters of tires by iteratively estimating the state trajectory of the vehicle using a set of collected sensor data, and update the parameters of the tires using the estimated state trajectory and the model of the motion of the vehicle.

On problem with this approach is that the time evolution of the state of stiffness is unknown, and a model of the motion including the state of stiffness is therefore unknown and cannot be verified. However, some embodiments are based on realization that the unknown state of stiffness can be regarded as stochastic disturbances acting on the, otherwise deterministic, model of the motion of the vehicle to produce model of the motion with unknown stiffness.

On the other hand, measurement model of the vehicle can also be represented to include the state of stiffness, e.g., a longitudinal velocity, a lateral velocity, and a rotation rate of the vehicle can be measured. In such a manner, the state of stiffness can be at least indirectly represented by the motion model and the measurement model. Specifically, the motion and the measurements models are related through a state trajectory driven by a vehicle, which should be the same if state of stiffness is known. The variation of the difference prevents determining the value of the stiffness, but allows determining probability distribution of the state of stiffness.

Some embodiments are based on another recognition that probabilistic state of stiffness does not fit into the model of the vehicle. However, some embodiments are based on realization that it is possible to sample the feasible space of the parameters of the state of stiffness defined by its probability distribution and use the sampled parameter in the joint estimation of the state of stiffness. However, the joint estimation should be used to update not the sampled state of stiffness, but to update the probability distribution of the state of stiffness. For example, the probability distribution can be updated to reduce the error between two state trajectories and to influence the value of the state of stiffness used in the subsequent iteration drawn from the updated distribution.

Accordingly, one embodiment discloses a method for calibrating parameters of tires of the vehicle by estimating a state of stiffness of the vehicle using an estimated state trajectory of the vehicle, wherein the state of the vehicle includes a velocity and a heading rate of the vehicle, and wherein the parameters of tires includes at least one parameter defining an interaction of at least one tire of the vehicle with a road on which the vehicle is traveling. The method includes retrieving from a memory a motion model of the vehicle relating the control inputs to the vehicle with the state of the vehicle and a measurement model of the vehicle, wherein the motion model of the vehicle is a combination of a deterministic component of the motion and a probabilistic component of the vehicle, and defines the motion of the vehicle as a function of time, wherein the probabilistic motion model includes the parameters having an uncertainty and defines disturbance on the motion of the vehicle, wherein the measurement model relates the measurements to the state of the vehicle; iteratively updating a probability distribution of the state of stiffness until a termination condition is met; updating the probability distribution of a state of stiffness to reduce an error between a first state trajectory of the vehicle and a second state trajectory of the vehicle; outputting at least one or a combination of the probability distribution of the state of stiffness and an estimate of the state of stiffness representative of the probability distribution of state of stiffness. The steps of the method are performed using at least one processor operatively connected to the memory.

Another embodiment discloses a system for calibrating a tire of a vehicle by estimating a state of stiffness of the vehicle using an estimated state trajectory of the vehicle, wherein the state of the vehicle includes a velocity and a heading rate of the vehicle, and wherein the parameters of tires includes at least one parameter defining an interaction of at least one tire of the vehicle with a road on which the vehicle is traveling. The system includes a memory storing a motion model of the vehicle relating the control inputs to the vehicle with the state of the vehicle, and a measurement model of the vehicle, wherein the motion model of the vehicle is a combination of a deterministic component of the motion and a probabilistic term of the motion, and defines the motion of the vehicle as a function of time, wherein the probabilistic motion model includes the parameters having an uncertainty and defines disturbance on the motion of the vehicle, wherein the measurement model of the vehicle relates the motion of the vehicle to the measurements; a processor to update the probability distribution of the state of stiffness until a termination condition is met; an output device to render one or a combination of the probability distribution and an estimate of the probability distribution of the state of stiffness when a termination condition is met.

Yet another embodiment discloses a non-transitory computer readable storage medium embodied thereon a program executable by a processor for performing a method. The method includes retrieving from a memory a motion model of the vehicle relating control inputs to the vehicle with a state of the vehicle and a measurement model of the vehicle relating measurements of the motion of the vehicle with the state of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defining disturbance on the motion of the vehicle; receiving motion data indicative of the motion of the vehicle on the road according to a trajectory, wherein the motion data include a sequence of control inputs to the vehicle that moves the vehicle according to the trajectory and a sequence of measurements of the motion of the vehicle moved along the trajectory, and wherein the sequence of measurements corresponds to the sequence of control inputs; updating iteratively a probability distribution of the state of stiffness until a termination condition is met, wherein an iteration determines a first state trajectory of the vehicle according to the motion model using the sequence of control inputs and one or multiple samples of the probability distribution of the state of stiffness, determines a second state trajectory of the vehicle according to the measurement model using the sequence of measurements, and updates the probability distribution of the state of stiffness to reduce an error between the first state trajectory of the vehicle and the second state trajectory of the vehicle; and rendering at least one or a combination of the probability distribution of the state of stiffness and a sample of the probability distribution of the state of stiffness when the termination condition is met.

DETAILED DESCRIPTION

Figure 1A:
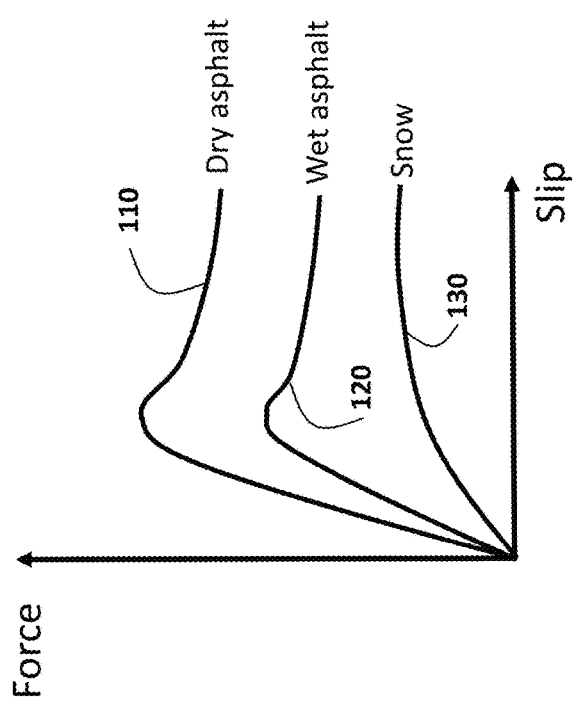
FIG. 1A is an illustration of how the magnitude of the force on a tire of vehicle traveled on a road varies with the slip for different types of the surface of the road.

FIG. 1A shows an illustration of how the magnitude of the force on a tire of vehicle traveled on a road varies with the slip for different types of the surface of the road such as dry asphalt 110, wet asphalt 120, and snow 130 surfaces. The tire-force relationship is highly nonlinear and also depends on other quantities, such as tire pressure, vehicle mass, tire temperature, and wear on the tire. As used herein, a vehicle can be any type of wheeled vehicle, such as a passenger car, bus, or rover.

FIG. 1A shows an exemplar situation when all other quantities except the slip are kept fixed. This is a per se method of illustrating the tire-force relationship. FIG. 1A can illustrate the longitudinal force, in which case the slip is defined in terms of the difference of the longitudinal velocity and the rotational speed of the wheel normalized by either the rotational speed of the wheel or the longitudinal velocity, whichever one is greater. FIG. 1A can illustrate the lateral force, in which case the slip is defined in terms of a ratio between the wheel's lateral and longitudinal velocity components.

FIG. 1A shows the situation when only one of the slip quantities are nonzero at the same time. In general, for example, when a driver of a vehicle is braking while also turning, both slip quantities are nonzero. Depending on the particular tire model used, the force-slip relation will look different.

Figure 1B:
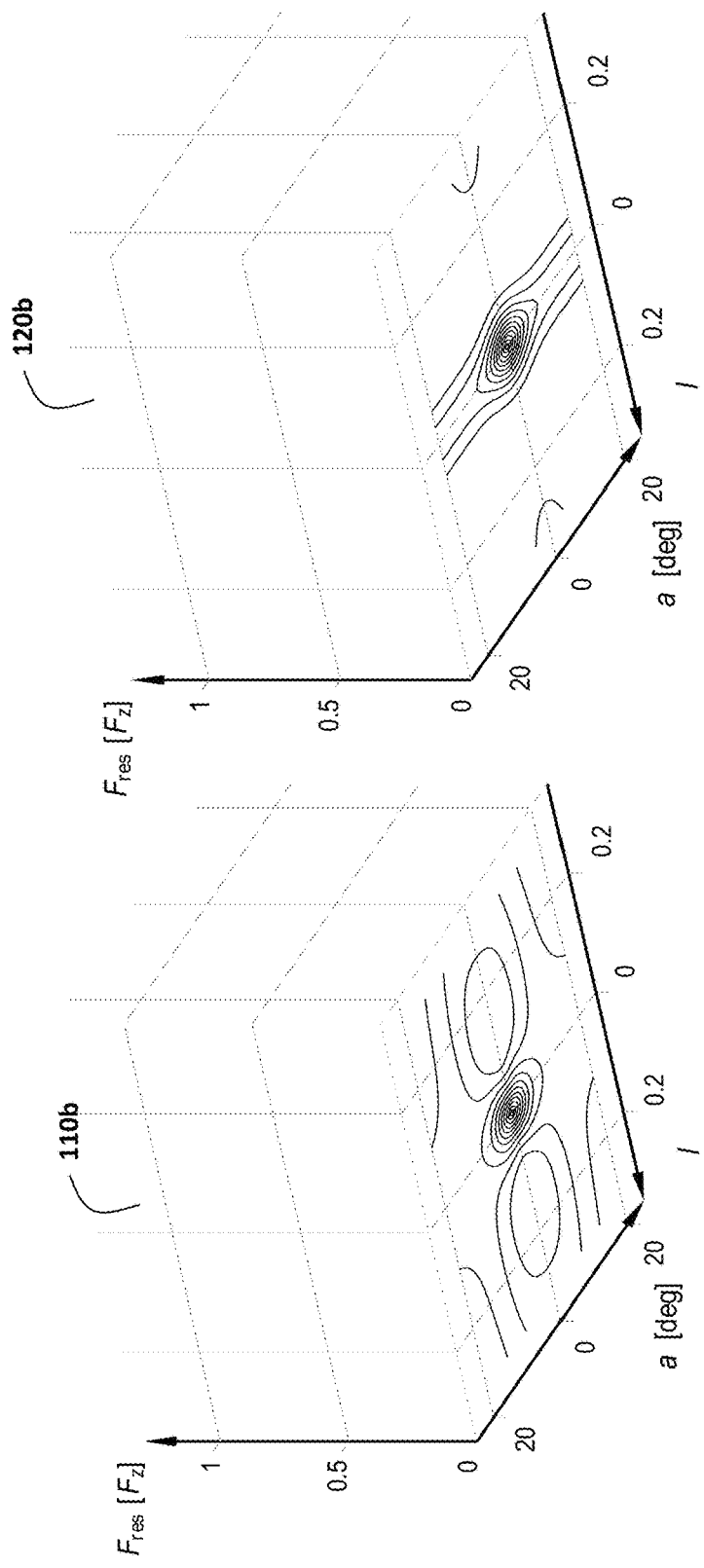
FIG. 1B is an illustration of how the magnitude of the force on a tire of vehicle traveled on a road varies with both longitudinal and lateral slip for different types of tire models.

FIG. 1B shows how the force of a tire of vehicle varies when the values of the slip quantities vary. The situation shows the results for two different tire models; the weighting functions model 110b, and the friction-ellipse model 120b. In the remainder of the description of the invention, one of the slip quantities are assumed zero for simplicity, but it is to be understood, and as a reader with experience within the field will appreciate, the invention as described herein also covers the case for combined slip.

Figure 1C:
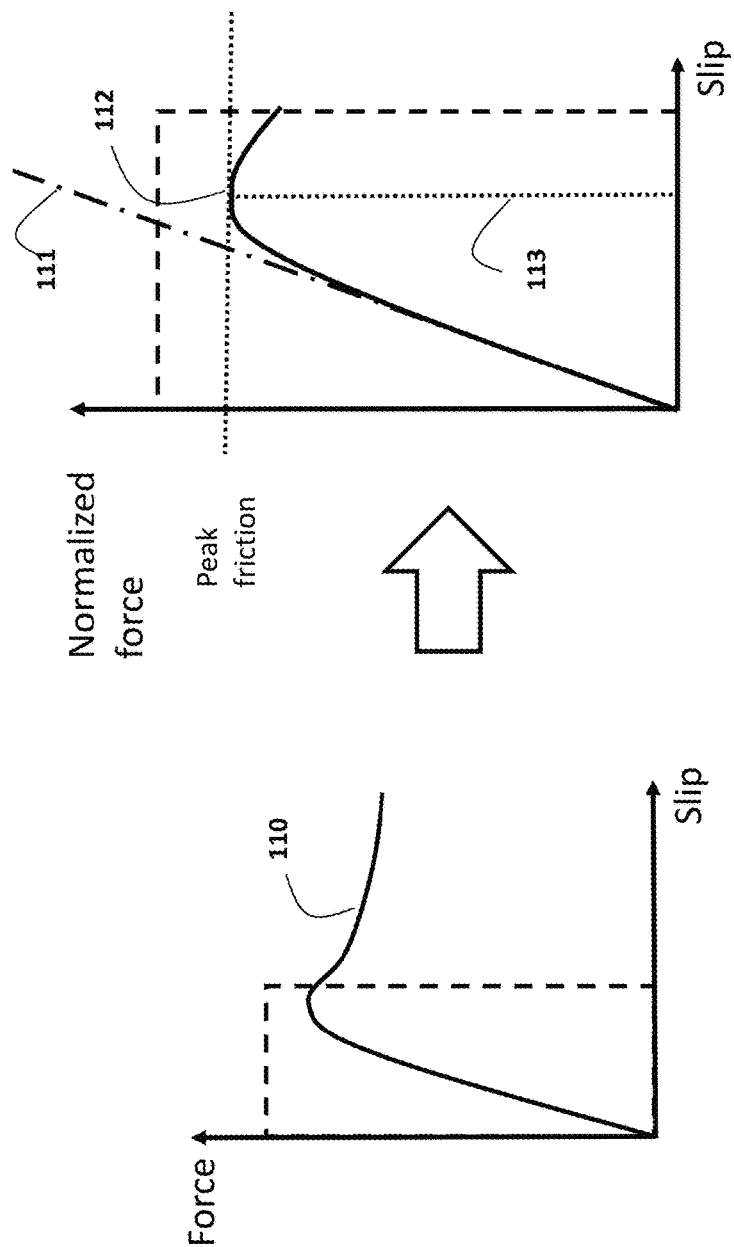
FIG. 1C is a zoomed-in version of FIG. 1A.

FIG. 1C shows a zoomed-in version of FIG. 1A, where the force has been normalized with the normal force resting on the wheel, where the case of dry asphalt 110 is considered in more detail. The value where the force attains its maximum is called the peak friction 112. The peak friction 112 is useful to know in several automotive control systems. For example, the knowledge of peak friction is important in order to know how much brake torque that can be applied to a particular wheel in electronic stability control systems (ESCs). The peak friction value and the corresponding slip value 113 can be used in anti-lock braking systems (ABS) to achieve optimal braking force. The initial slope 111 of the force curve 110 is usually called the stiffness of the tire. During normal driving, in which case the slip is small, the force curve can be approximated with the tire stiffness 111.

Figure 1D:
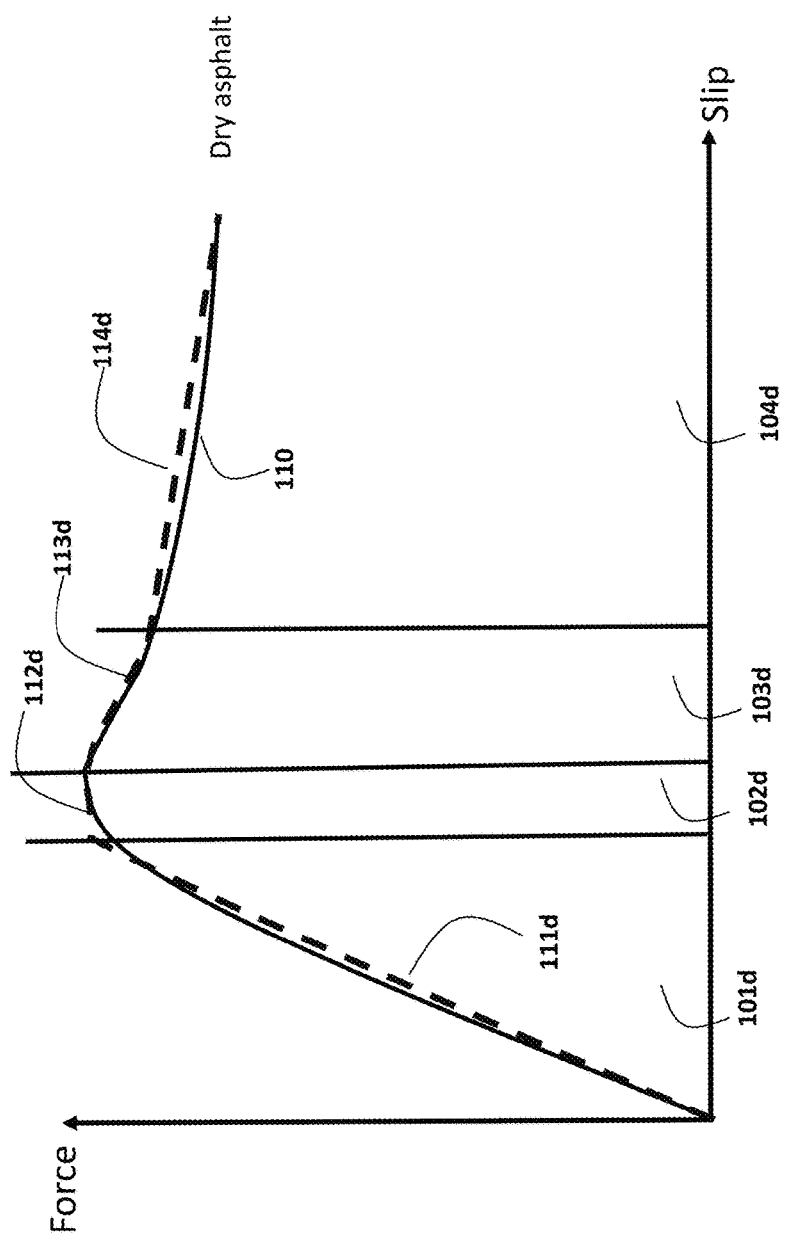
FIG. 1D is an illustration of how to approximate the tire force curve by approximating the curve with multiple state of stiffness.

In relation, FIG. 1D shows an approximate model of the tire-force curve as used by several embodiments in the invention. In this particular example, the force curve 110 is approximated by 4 piece-wise affine curves 111d, 112d, 113d, 114d, which correspond to intervals 101d, 102d, 103d, and 104d. That is, depending on the value of the slip value, the linear curve that approximates the true force curve differs. As will be explained by later embodiments of the invention, it is easier to estimate a multiple of linear curves than to estimate a single nonlinear function parameterized by different constants. For example, a common way to model the tire force relation is through the Magic formula, or Pacejka model, given by $$F_0(m) = D \sin(C \arctan(Bm - E(Bm - \arctan(Bm)))), \quad (1)$$

where B is the stiffness factor, C is the shape factor, D is the peak factor, corresponding to the peak friction coefficient, E is the curvature factor, $F_0$ is either the longitudinal force or lateral force, and m is either the longitudinal slip or the lateral slip. Equation (1) is highly nonlinear and depends on 5 parameters. However, to determine the parameters of Equation (1) is difficult, since the force cannot be directly measured. Instead, if a piece-wise affine approximation is used, the nonlinear relation (1) can be exchanged by a multiple of linear curves on the form $$F^x \approx C_\lambda \lambda$$

$$F^y \leq C_\alpha \alpha,$$

where $C_\lambda$ is the slope of the linear curve, the tire stiffness, in the longitudinal direction of the wheel, $C_\alpha$ is the tire stiffness in the lateral direction of the wheel, $\lambda$ is the longitudinal wheel slip, and $\alpha$ is the lateral wheel slip.

Figure 1E:
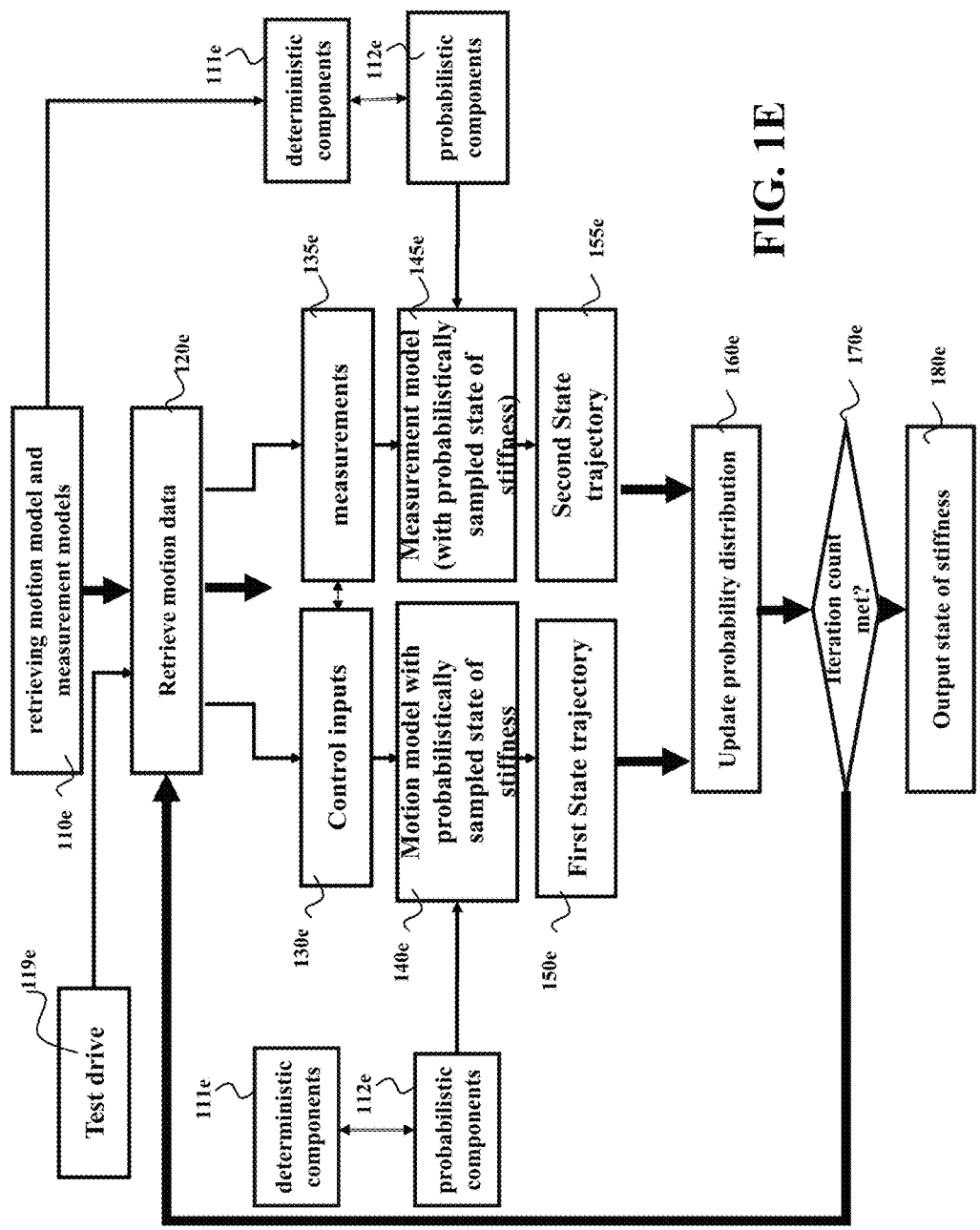
FIG. 1E is a flowchart of a method for iteratively estimating a multiple of state of stiffness of tires of the vehicle according to one embodiment of the invention.

FIG. 1E shows a flowchart of a method for iteratively updating a probability distribution of the state of stiffness until a termination condition is met. The embodiment is based on recognition that the unknown state of stiffness can be regarded as stochastic disturbances acting on a, otherwise deterministic, model of a motion of the vehicle. The nature of the stochastic disturbance causes the vehicle to have different possible motions, and therefore different possible states.

To that end, the embodiment retrieves from a memory a model 110e of the motion of the vehicle relating control inputs to the vehicle with the state of the vehicle and a model of the measurements of the vehicle, relating measurements of the motion of the vehicle with the state of the vehicle. The motion model of the vehicle includes a combination of a deterministic component 111e of the motion and a probabilistic 112e component of the motion, wherein the probabilistic component of the motion includes the state of stiffness having an uncertainty and defining disturbance on the motion of the vehicle. Then, the method retrieves 120e from a memory storing motion data 119e from a test drive of a vehicle, indicative of the motion of the vehicle on the road according to a trajectory, wherein the motion data include a sequence of control inputs 130e to the vehicle that moves the vehicle along the indicative trajectory. The motion data also includes 135e a sequence of measurements of the motion of the vehicle moved along the trajectory, and wherein the sequence of measurements corresponds to the sequence of control inputs. Then, the method uses the control input 130e in combination with the probabilistic component 111e and the probabilistic component 112e, and one or a multiple of probabilistically sampled state of stiffness that defines a disturbance on the motion of the vehicle, to form a first state trajectory 150e indicative of the motion of the vehicle. Meanwhile, the method uses the measurements 135e and the measurement model 145e to determine a second state trajectory, and updates 160e the probability distribution of the state of stiffness to reduce an error between the first state trajectory of the vehicle and the second state trajectory of the vehicle. If a termination condition 170e is met, the method outputs 180e one or a combination of the probability distribution of the state of stiffness and a sample of the probability distribution of the state of stiffness.

In some embodiments, the measurement model includes a combination of a deterministic component independent from the state of stiffness and a probabilistic component of the measurement model that includes the state of stiffness. In one embodiments, this combination is used to determine a second state trajectory using the sequence of measurements and the samples of the state of stiffness.

Figure 1F:
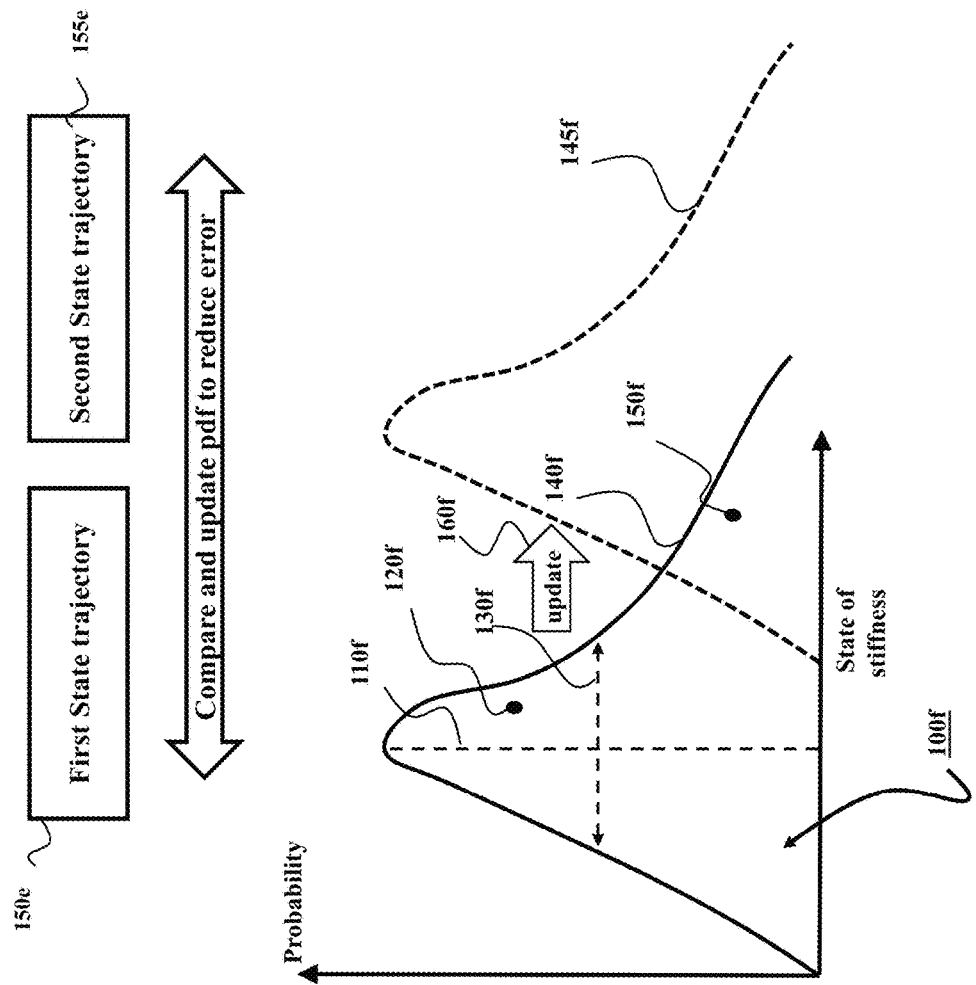
FIG. 1F is a graph illustrating probability distribution function defining the feasible space of the state of stiffness according to one embodiment of the invention.

FIG. 1F shows a graph illustrating probability distribution function 140f defining the feasible space 100f of the state of stiffness. The shape of the function 140f, that is, the representation of the state of stiffness 140e, can be determined in advance. For example, if the distribution of the state of stiffness is Gaussian, the shape of the distribution 140f is the "Gaussian hat" shape. If the shape is fixed, in case of a Gaussian distribution the mean 110f and the variance 130f define the distribution 140f, and the feasible space 100f from which the sample parameter of the state of stiffness can be drawn. However, a number of other representations of state of stiffness can be used. For example, if a Normal-inverse Wishart distribution is used, the sufficient statistics consists of four parameters, where the mean is one of them. In general, any representation can be used but some representations of the state of stiffness are more appropriate for certain motion models. One embodiment draws one or a multiple of state of stiffness from the probability distribution of the state of stiffness for each corresponding values of the control input and the measurement. For instance, in one embodiment the probability distribution of the state of stiffness is modeled as a Gaussian distribution defined by its mean and variance, and at each step corresponding to the time steps of the control inputs and measurements, one or a multiple of samples are drawn from the distribution and used as a component in the motion model. Thus, by drawing several samples, each control input will lead to a slightly different trajectory, which will be more or less consistent with the second state trajectory from the sequence of measurements. By keeping a plethora of sampled values when generating the first state trajectory, it is possible to decrease the number of iterations of the method.

As used herein, sampling the values of the state of stiffness is drawing the values with probabilities defined by the distribution 140f, which is in turn defined by the underlying parameters of the state of stiffness. For example, according to the distribution 140f, the probability of a sample 120f to be drawn or sampled is higher than the probability of the sample 150f. Such a representation allows iteratively updating 160f the probability distribution of the state of stiffness to produce an updated distribution 145f defining updated feasible space for sampling state of stiffness, to be used in subsequent iterations until the termination condition 170e is met.

Figure 1G:
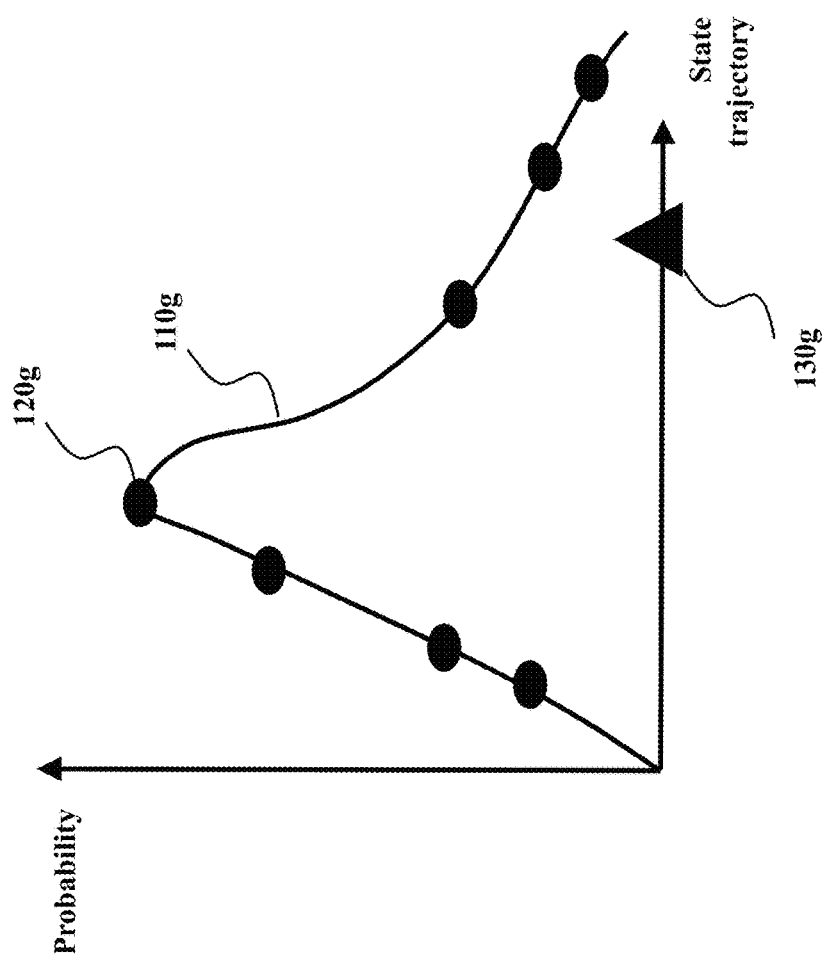
FIG. 1G is a graph for illustrating a method for determining the first state trajectory by constructing a probability distribution function from the weighted state trajectories according to principles employed by embodiment of the invention.

Referring to FIG. 1G, in one embodiment the method generates the first state trajectory by constructing a probability distribution function 110g from several state trajectories 120g generated by the multiply sampled state of stiffness and the control inputs, weighted by the respective consistency with the second state trajectory state trajectories, and drawing a state trajectory 130g from the distribution 110g. Doing in such a manner always ensures that the first state trajectory, used in updating the sufficient statistics, is representable of the distribution of the state trajectories.

Several embodiments utilize the fact that the state of stiffness and the control inputs are related to each other by the forces of the tire. In one embodiment, the control inputs include commands specifying values of one or combination of a steering angle of the wheels of the vehicle and a rotational velocity of the wheels. The steering angle of the wheel affects the forces 110b 120b that can be generated in either direction of the wheel. For example, if the steering angle of the wheel is zero the vehicle is moving along a line and the forces will be directed in one direction. However, if a nonzero steering angle is enforced, the force will be divided into a longitudinal component and a lateral component, which will affect how the state of stiffness can be determined. One embodiment uses measurements that include values of one or combination of a rotation rate of the vehicle and an acceleration of the vehicle, which means that the corresponding measurement model will have a component dependent on the state of stiffness and one component independent of the state of stiffness. Thus, one embodiment utilizes the fact that information about the state of stiffness is contained directly in the measurement sequence. The state trajectories can be composed in several ways. In one embodiment, the state trajectory includes a sequence of states, each state includes a velocity and a heading rate of the vehicle, such that the motion models the value of the control inputs to a first value of the state of the vehicle through dynamics of the vehicle at consecutive time steps, and the measurement model relates the value of the measurement to a second value of the state of the vehicle at the same time step.

Figure 2A:
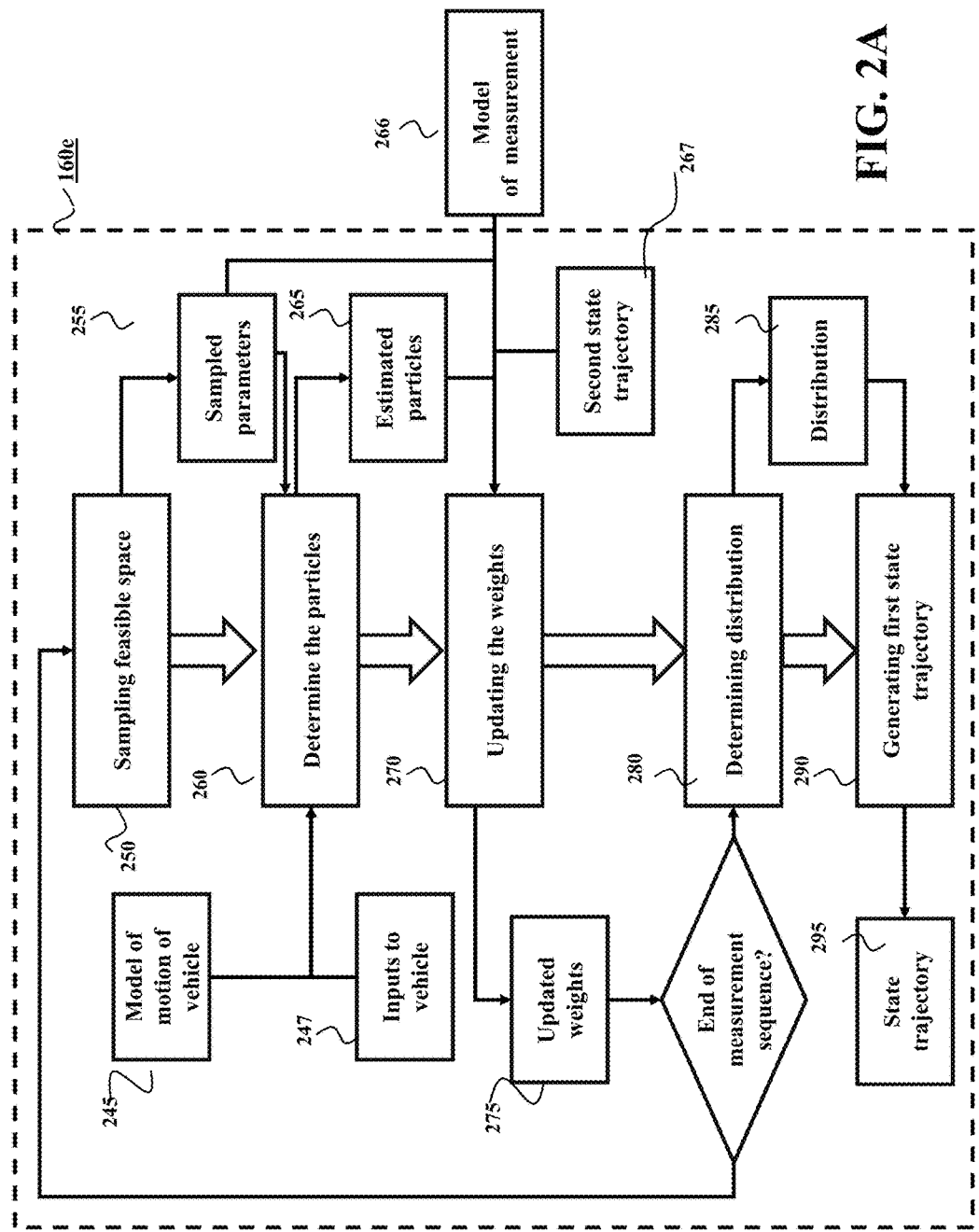
FIG. 2A is a flowchart of a method for generating the first state trajectory according to principles employed by embodiment of the invention.

Generating the first state trajectory 150e can be done in several ways. FIG. 2A shows a block diagram of a method for generating the first state trajectory 150e according to some embodiments of the invention. The method can be implemented using a processor of the vehicle. The method samples 250 a feasible space of possible state of stiffness to be used in a model of the motion 245 of the vehicle to produce a set of sampled state of stiffness. The model 245 of the motion of the vehicle includes an uncertainty on the motion of the vehicle due to the uncertainty in state of stiffness. The method determines 260, using the model 245 of the motion of the vehicle and inputs 247 to the vehicle, a set of particles 265 representative of the possible motion due to the different sampled state of stiffness 255 that affect the motion of the vehicle in different ways. The determining of the particles is done for each step of the control and measurement sequence, thus forming a trajectory of particles representing the first state trajectory.

Next, the method uses the determined particles 265 at each step consistent with the measurement in a measurement relation 266, and compares with the second state trajectory 267 of the vehicle, obtained from a memory, either located on the vehicle or remotely connected to a processor of the vehicle, to update the weights 270 that indicate how likely each particle is to be representative of the true state. The model of the measurement 266 maps each determined particle to a determined measured state, and the method produces updated weights 275 by calculating a difference between the second state trajectory 267 and each determined measured state, to reflect how well each determined particle 265 reflects the measurement. If the end of the measurement sequence has not been reached, that is, if not all measurements in the motion data have been processed, the method reiterates by sampling 250 the feasible space. If the end of the measurement sequence has been reached, the method determines 280 the distribution of the state trajectory. For example, the method 280 can directly use the finite set of weights 275 to reflect the distribution of the state trajectory, or the method can produce a continuous distribution of the state trajectories, by smoothing out the weights using, e.g., a kernel density smoother. The resulting distribution 285 is then used for generating the first state trajectory 290. For example, one embodiment produces the first state trajectory 295 by generating a sample from the distribution 285. Another embodiment determines the first state trajectory as a combination of the initial state trajectories weighted according to the weights of each initial first state trajectory. In yet another embodiment, one state trajectory is retained in one particle throughout. This state trajectory can be predefined, e.g., by simulating the system using the model of the motion of the vehicle and ensuring that this state trajectory is kept as one of the particles throughout. Or, at each determining the particles, the state trajectory is connected with one of the particles at a previous iteration of the method, where the connection is done by sampling a value for one of the particle indices with probability proportional to the updated weight 275. In some embodiments, the outputted entities, except for the state trajectory, consists of the generated samples of the feasible space that generated the state trajectory.

Although mathematically equivalent, which one of them to choose might have big impact in a practical implementation of the method, e.g., because of finite numerical precision in the digital processor performing the calculations or because of numerical scaling differences between the inputs and the state trajectories.

Figure 2B:
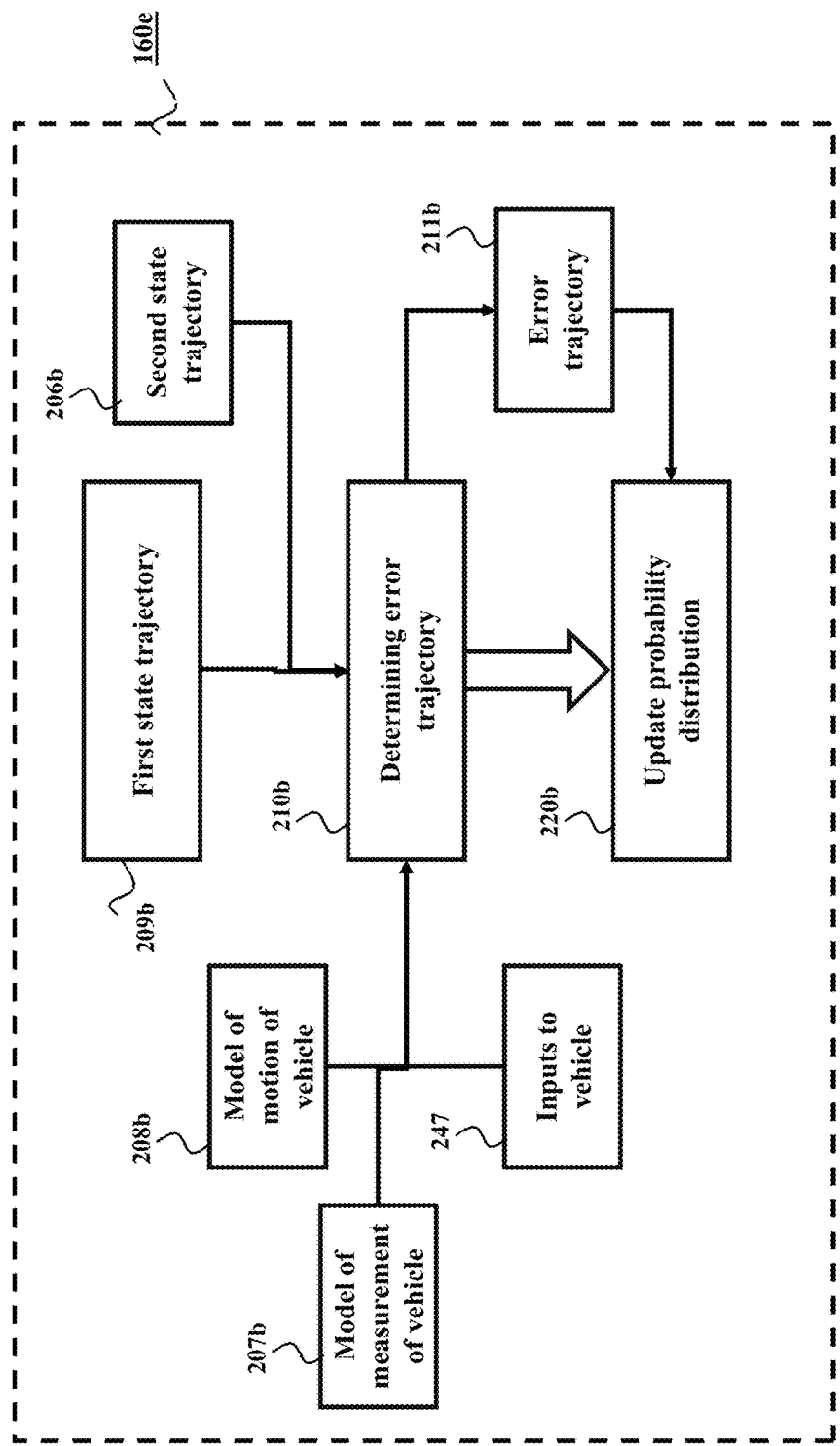
FIG. 2B is a flowchart of a method for updating the probability distribution of the state of stiffness according to principles employed by embodiment of the invention.

FIG. 2B shows a block diagram of one iteration of a method for updating the probability distribution of state of stiffness. The method determines an error trajectory 210$b$ representative of the difference between the first state trajectory 209$b$ and the second state trajectory 206$b$. The method uses the model of measurements of the vehicle 207$b$, the model of motion of the vehicle 208$b$, and the inputs to the vehicle to produce a n error trajectory 211$b$. Then, the method updates 220$b$ probability distribution by using the error trajectory 211$b$. In some embodiments, the updating 220$b$ is done by averaging over the sufficient statistics estimated in previous iterations of the method and the error trajectory.

In some embodiments, the first state trajectory 295 generated from weighting each initial first state trajectory representing an error between the initial first state trajectory and the second state trajectory is used to directly updating the probability distribution by decreasing the error between the first state trajectory and the motion resulting in the first state trajectory when used in the motion model. Such an error reflects the error due to the error in state of stiffness and can be used to update the probability distribution of state of stiffness. This is possible because the second state trajectory is already used in determining the first state trajectory and is influencing the weight of each first state trajectory.

Figure 3A:
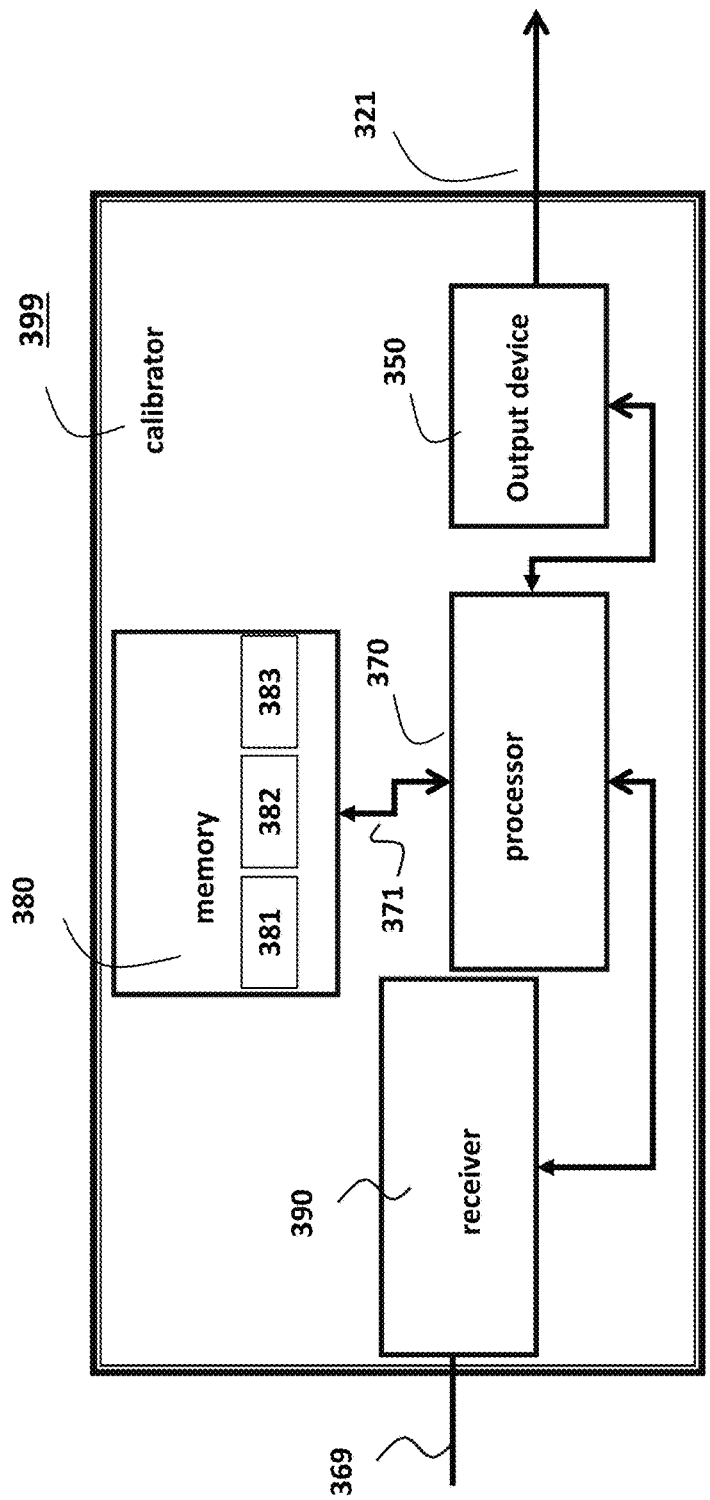
FIG. 3A is a schematic of a general tire calibrator of a tire.

FIG. 3A shows a general structure of a system 399 for calibrating a tire of a vehicle by estimating a state of stiffness of tires of the vehicle, the state of stiffness including at least one parameter defining an interaction of at least one tire of the vehicle with a road. The tire calibrator 399 includes at least one processor 370 for executing modules of the tire calibrator 399, such as updating iteratively a probability distribution of the state of stiffness until a termination condition is met, wherein an iteration determines a first state trajectory of the vehicle according to the motion model using the sequence of control inputs and one or multiple samples of the probability distribution of the state of stiffness, determines a second state trajectory of the vehicle according to the measurement model using the sequence of measurements, and updates the probability distribution of the state of stiffness to reduce an error between the first state trajectory of the vehicle and the second state trajectory of the vehicle. The processor 370 is connected 371 to a memory 380 that stores a motion model 381 of the vehicle relating control inputs to the vehicle with a state of the vehicle and a measurement model 382 of the vehicle relating measurements of the motion of the vehicle with the state of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defining disturbance on the motion of the vehicle.

The calibrator can also store 383 the motion data indicative of the motion of the vehicle on the road according to a trajectory, wherein the motion data include a sequence of control inputs to the vehicle that moves the vehicle according to the trajectory and a sequence of measurements of the motion of the vehicle moved along the trajectory, and wherein the sequence of measurements corresponds to the sequence of control inputs. Alternatively, the calibrator can contain a receiver 390 to receive motion data 369 indicative of the motion of the vehicle on the road according to a trajectory. The system also includes an output device 350 device to render at least one or a combination of the probability distribution of the state of stiffness and a sample of the probability distribution of the state of stiffness when the termination condition is met. To enable certain embodiments of the invention, the memory 380 also stores 383 the internal information of the estimator, including, but not limited to, values of the state of stiffness, values of each computed state trajectory of the vehicle for different iterations, the motion leading up to each state of the vehicle, and the sampled feasible space leading up to the state trajectories.

Figure 3B:
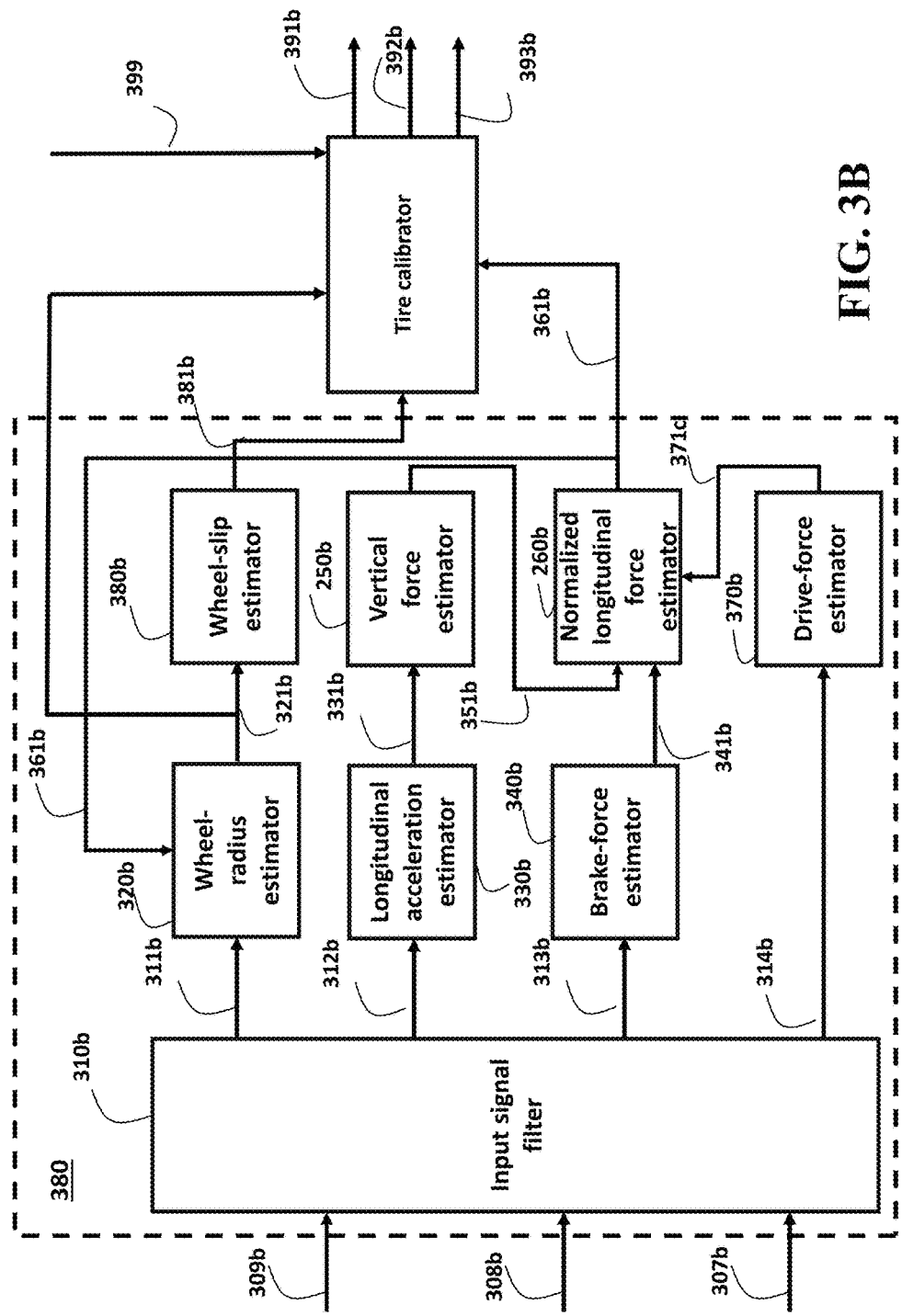
FIG. 3B is a block diagram of a method for determining or estimating the internal signals from the vehicle according to one embodiment.

In one embodiment, the motion data indicative of the motion of the vehicle is preprocessed before execution. FIG. 3B shows a block diagram of a method for determining or estimating the internal signals from the vehicle, to be used by the tire calibrator, according to one embodiment. The steps leading up to 381$b$ and 361$b$ can be implemented into a control unit or circuit arrangement, which can be used in systems such as ABS, ESP, ADAS, or in autonomous vehicles. For example, input signal filter 310$b$ can determine the input signals by processing rotational rate of the wheels or tires 309$b$ to produce a signal 311$b$, whereby the rotational rates can be determined for each individual wheel or tire of the vehicle. The filter 310$b$ can also determine the input signal 312$b$ by processing the brake pressure 208$b$ and determine the input signal 313$b$ by processing the rotational rate and torque from the engine 307$b$. The block 330$b$ determines the longitudinal acceleration 331$b$, while a brake-force estimator 340$b$ estimates the braking force 341$b$ for each wheel using the applied brake pressures 313$b$. From the values of the engine torques and rotation rate 314$b$ of the engine, a module in the control unit estimates the driving force in the longitudinal direction, while the vertical force 351b is estimated in 350b, for example using estimates of the longitudinal acceleration 331b.

Using the vertical force estimates 351b and the longitudinal force estimates 341b and 371b, the normalized longitudinal force 361b can be determined. A wheel-radius estimator 320b uses the processed rotational rates 311b of the tires or wheels and the estimate of the normalized driving force 361b to correct the wheel radius and outputs the wheel radius with the rotation rates 321b. For example, the wheel-radius estimator 320b estimates the wheel-slip 321b. Thus, the signal conditioner 320 can provide the state-of-stiffness estimator 340 with estimates of the longitudinal velocity 321b, wheel-slip estimates 381b, or normalized longitudinal force 361b, or a combination thereof. Accordingly, in some embodiments, the tire calibrator 350 uses the estimates of one or combination of the longitudinal velocity 321b, wheel-slip estimates 381b, and normalized longitudinal force 361b.

Figure 3C:
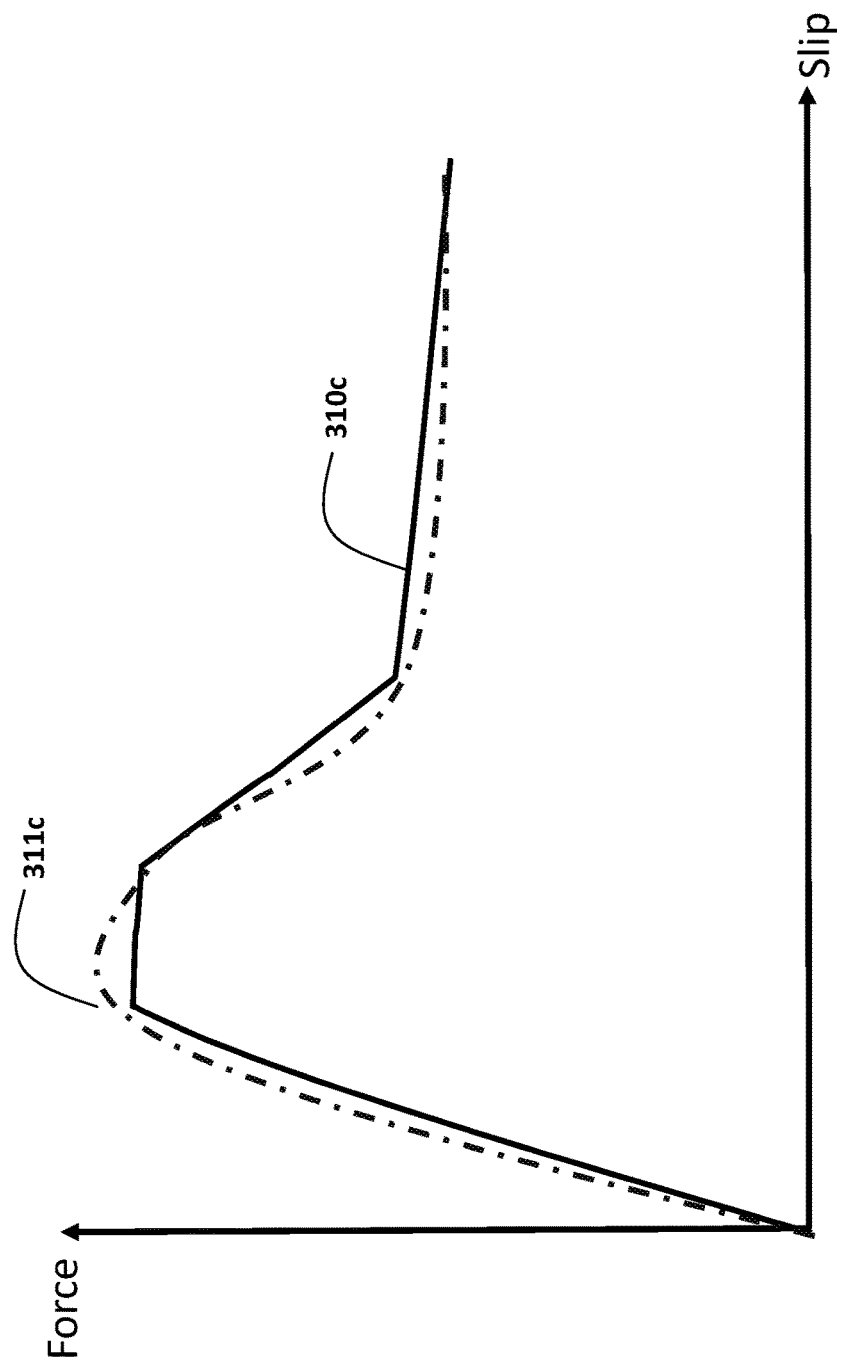
FIG. 3C is a graph for illustration of fitting a curve to the estimated state of stiffness according to one embodiment.

The tire calibrator can be used either as an initializer of a real-time friction estimator, or it can stand on its own as a method for calibrating parameters of tires. For example, referring back to Equation (1) as a possible model of the relation between the slip and the friction, there are 5 different parameters to be estimated. To this end, referring to FIG. 3C, one embodiment of the invention estimates the parameters in Equation (1) in an optimization procedure in which the difference between the output from Equation (1) and the state of stiffness estimation 310c, resulting in Equation (1) as in 311c.

In some embodiments, the state of the vehicle evolves dynamically in time according to a model of the motion of the state of the vehicle. For example, the model of the motion of the vehicle can be described according to some nonlinear function $$x_{k+1} = f(x_k) + g(x_k)v_k,,$$
$$y_k = h(x_k) + e_k,$$

where v is a random variable, the process noise. In some embodiments, the process noise is Gaussian according to $v \sim N(\mu, \Sigma)$ with unknown mean $\mu$ and variance $\Sigma$, and where the process noise $v_k$ and measurement noise $e_k$ can be dependent on each other. Furthermore, $f(x_k)$ is a nonlinear deterministic function describing the evolution of the state of the vehicle. Similarly, $g(x_k)$ is a nonlinear deterministic function mapping the random variable, or disturbance, to the state of the vehicle, $x_k$ is the state, and k is the time index.

The dynamic model of the motion of the vehicle depends on the state of stiffness, including mean of the stiffness, variance of the stiffness, and friction coefficient in each direction of each tire. In some embodiments, the disturbance $v_k$ affecting the motion of the vehicle is due to uncertainties in the numerical description of the tire stiffness. In other embodiments, the state of the vehicle includes a velocity vector and a heading rate of the vehicle.

Figure 4A:
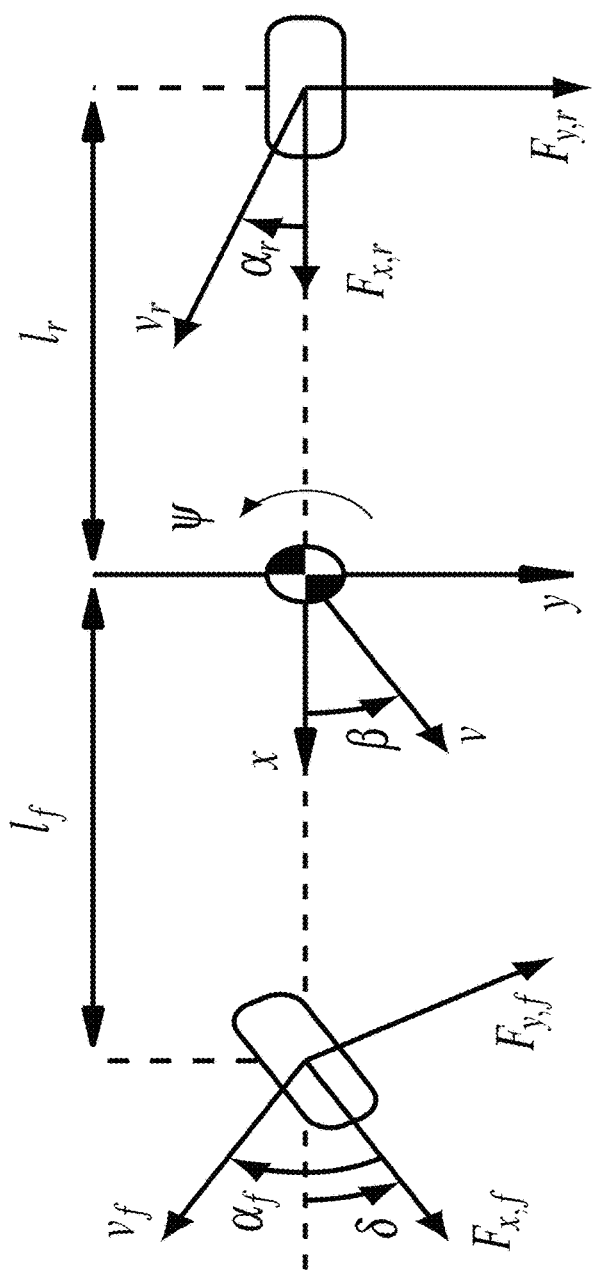
FIG. 4A is a schematic of a simplified vehicle model.
Figure 5A:
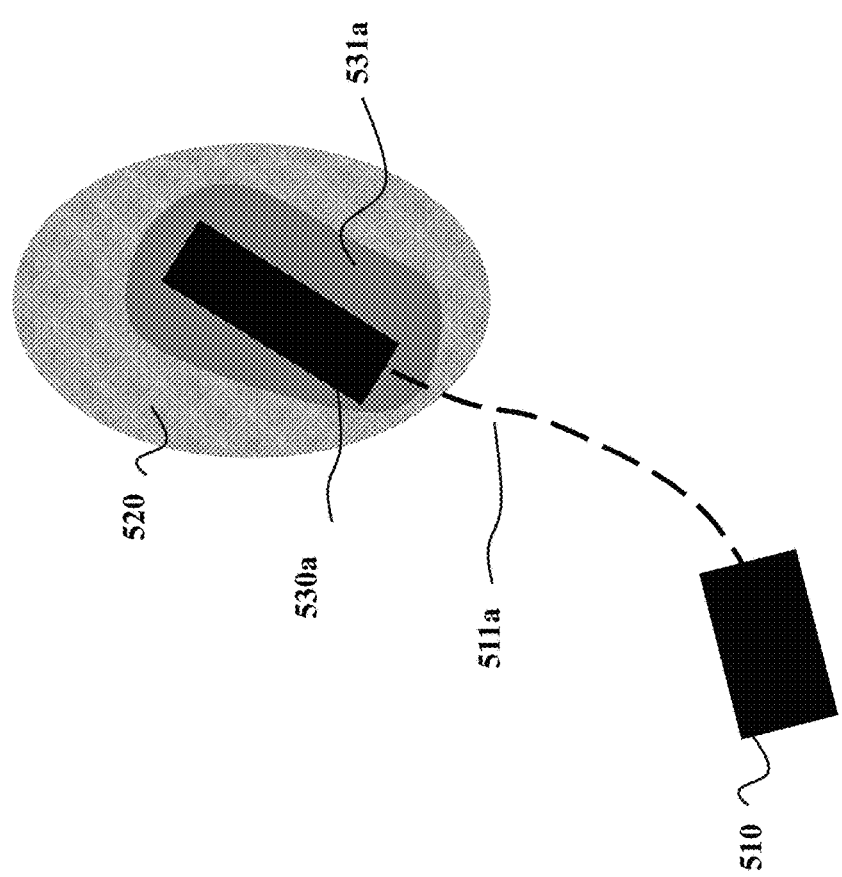
FIG. 5A is a schematic of how to assign probabilities determined according to some principles employed by various embodiments of the invention.

Different types of motion models can be used. For computation purposes, a simple model is preferred, because it facilitates fast implementations computation wise. However, a high-fidelity model is preferred if model accuracy is important. Moreover, depending on the model that is employed by the invention, different number of parameters can be calibrated. For example, FIG. 4A shows a schematic of a simplified front-wheel drive single-track model of the vehicle, in which the two wheels on each axle are lumped together. This model depends on 4 state of stiffness when accelerating, one longitudinal and two lateral. In FIG. 5A, δ is the steering angle of the front wheel, α is the slip angle in the lateral case, β is the body slip of the vehicle, which is defined as the ratio of the forward and lateral velocity of the vehicle, and $F_{x,y}$ is the longitudinal (forward) and lateral force, respectively.

Figure 4B:
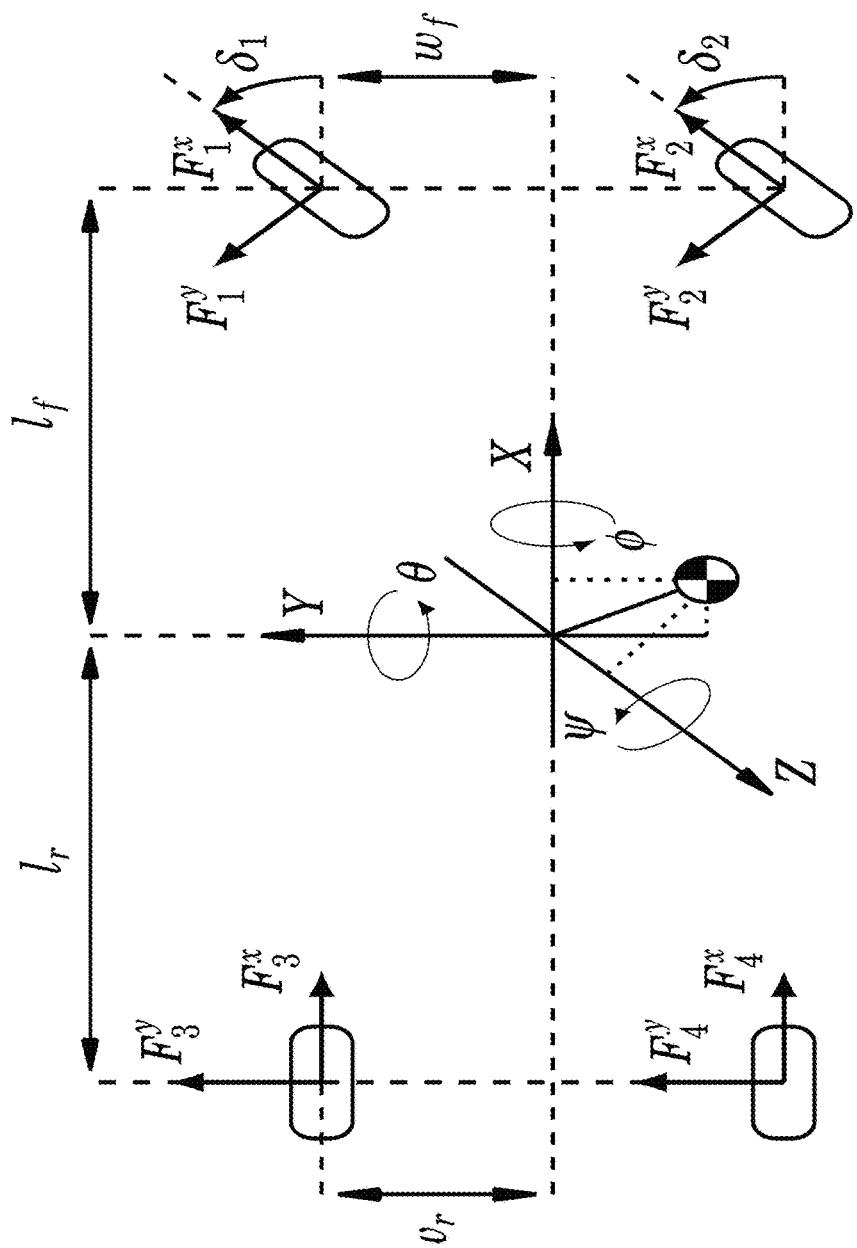
FIG. 4B is a schematic of a full-order vehicle model.

FIG. 4B shows a schematic of a double-track model, which models all 4 wheels. With such a model, 8 state of stiffness affect the motion of the model of the vehicle. In the following embodiments the single-track model in FIG. 5A serves as model, but it is to be acknowledged that the model in FIG. 5B can be readily used. FIG. 4B shows a schematics of a full chassis model with front steering. In such a case, the number of parameters to be estimated increases, but it is to be understood that the same method applies.

To illustrate why the state trajectory gives information about the level of accuracy in the estimate of the state of stiffness, FIG. 5A illustrates a scenario where the vehicle has an initial state 510. For one set of sampled state of stiffness, sampled from the probability distribution of the state of stiffness, and a given input to the system, the vehicle obeys the motion 511a and ends up in 530a, with resulting uncertainty 531a. The inherent uncertainty in the second state trajectory arising due to noise, bias in sensors, and remaining sensor errors, leads to that the state of the vehicle can only be known up to a certain area 520. However, the end state of the vehicle 530a well resides within the area 520, so this particular combination of state of stiffness and initial state of the vehicle, is given a high probability of being a good combination. Hence, the probability distribution of the state of stiffness is likely to be a good distribution.

Figure 5B:
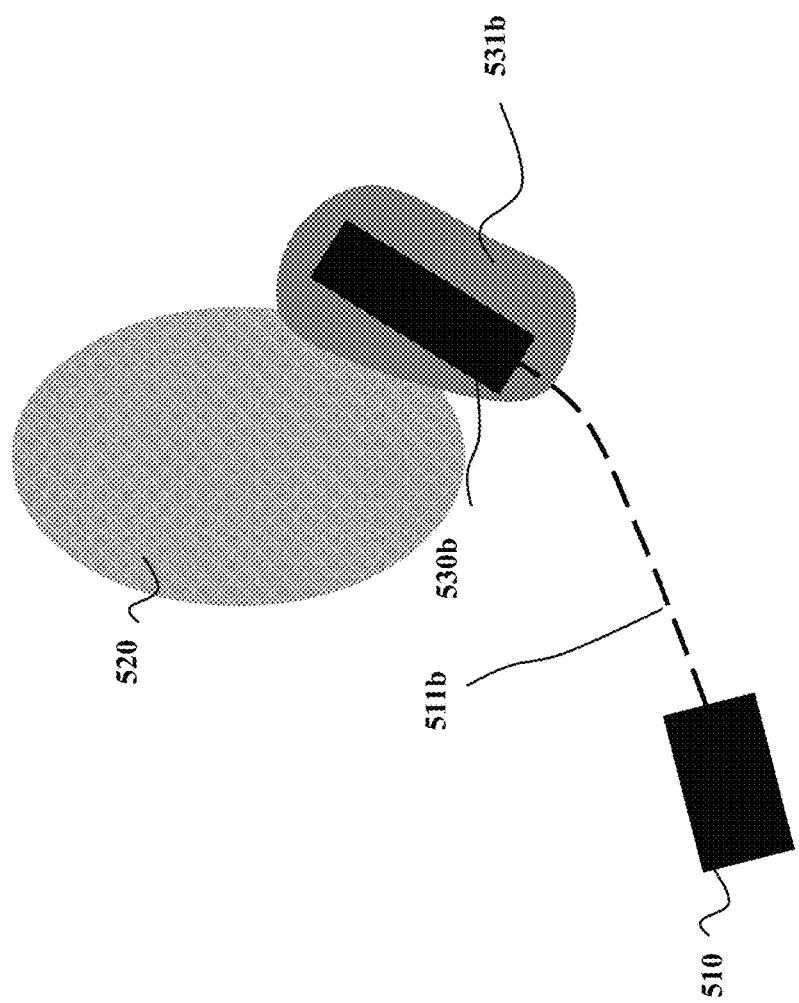
FIG. 5B is a schematic of how to assign probabilities determined according to some principles employed by various embodiments of the invention.

FIG. 5B shows a vehicle with the same initial state 510, possibly with the same bias terms of the sensors, but with another particular set of state of stiffness. For the same inputs to the system, the vehicle 510 now obeys the motion 511b, leading to that the vehicle ends up in state 530b, with resulting uncertainty 531b. However, this end state 530b of the vehicle does not reside within the certainty area of the sensors. Thus, this particular combination of initial state, sampled state of stiffness, and bias terms, is assigned a low probability of being a good combination. Hence, the estimated distribution of the state of stiffness is not likely to be a good distribution.

In some embodiments, the generating the first state trajectory is done by generating N states, $\{x_T^i\}_{i=1}^N$, at each time step, and associate a weight $w_T^i$ with each generated state, to become a particle, to reflect how good the particular state predicts the measurement at the particular time step. In some embodiments, whenever a particle gets assigned a low weight below some threshold, the particle is removed from the estimating and replaced with a particle that has a higher weight, that is, a higher probability of being a good particle. The update of distribution of state of stiffness can be done in several ways. One embodiment takes the difference between the estimated state trajectory from the second to the last time instant and the predicted motion of the state trajectory from the first and second to last time step, updates parameters of the distribution using the said difference. For example, in one embodiment the distribution of state of stiffness is modeled as a Normal-inverse Wishart distribution.

Figure 6A:
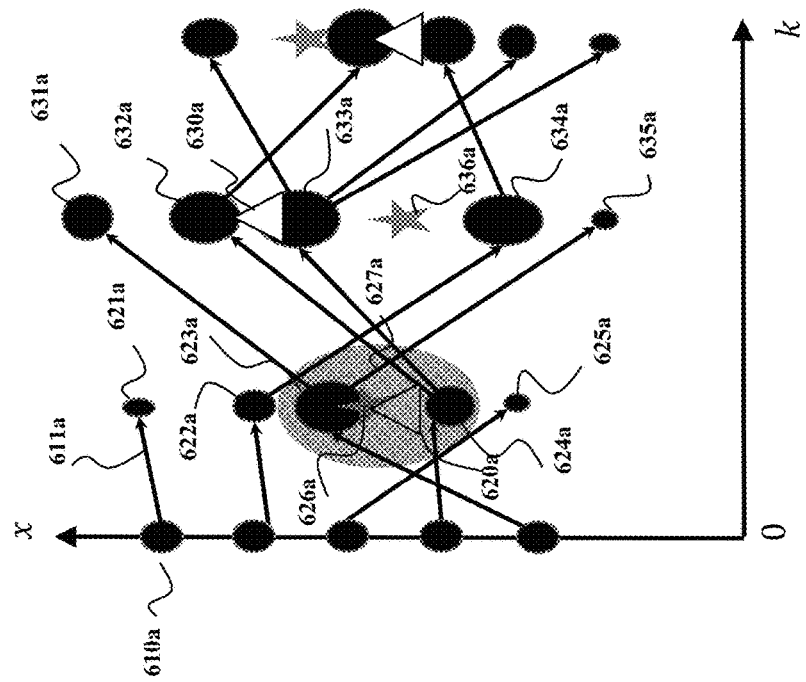
FIG. 6A is a schematic of the result of three iterations of generating a first state trajectory when five sampled stiffness values are generated for each iteration according to some embodiments.

FIG. 6A shows a simplified schematic of the result of three iterations of generating a first state trajectory when five sampled stiffness values are generated for each iteration. The initial state 710a is predicted forward in time 611a using the model of the motion and the inputs to the system and the five sampled stiffness values, used to parameterize the dynamic model, to produce five next states 621a, 622a, 623a, 624a, and 625a. The probabilities are determined as a function of the measurement 626a and the model of the noise source and the bias 627a of the measurement 626a. At each time step, i.e., at each iteration, an aggregate of the probabilities is used to produce an aggregated state 620a.

Figure 6B:
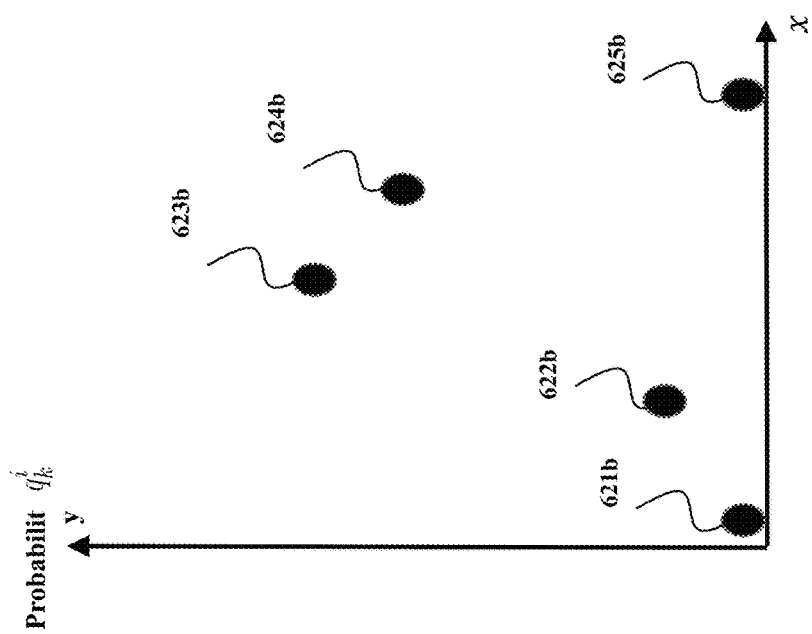
FIG. 6B is a schematic of possible assigned probabilities of the five states at the first iteration in FIG. 6A.

FIG. 6B shows possible assigned probabilities of the five states at the first iteration in FIG. 6A. Those probabilities 621b, 622b, 623b, 624b, and 625b are reflected in selecting the sizes of the dots illustrating the states 621b, 622b, 623b, 624b, and 625b.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A system for calibrating a tire of a vehicle by estimating a state of stiffness of tires of the vehicle, the state of stiffness including at least one parameter defining an interaction of at least one tire of the vehicle with a road, comprising:
a memory to store a motion model of the vehicle relating control inputs to the vehicle with a state of the vehicle and a measurement model of the vehicle relating measurements of the motion of the vehicle with the state of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defining disturbance on the motion of the vehicle;
a receiver to receive motion data indicative of the motion of the vehicle on the road according to a trajectory, wherein the motion data include a sequence of control inputs to the vehicle that moves the vehicle according to the trajectory and a sequence of measurements of the motion of the vehicle moved along the trajectory, and wherein the sequence of measurements corresponds to the sequence of control inputs;
a processor to update iteratively a probability distribution of the state of stiffness until a termination condition is met, wherein an iteration determines a first state trajectory of the vehicle according to the motion model using the sequence of control inputs and one or multiple samples of the probability distribution of the state of stiffness, determines a second state trajectory of the vehicle according to the measurement model using the sequence of measurements, and updates the probability distribution of the state of stiffness to reduce an error between the first state trajectory of the vehicle and the second state trajectory of the vehicle; and
an output device to render at least one or a combination of the probability distribution of the state of stiffness and a sample of the probability distribution of the state of stiffness when the termination condition is met.

2. The system of claim 1, wherein the measurement model of the vehicle includes a combination of a deterministic component of the measurement model independent from the state of stiffness and a probabilistic component of the measurement model that includes the state of stiffness, and wherein the second state trajectory is determined according to the measurement model using the sequence of measurements and the samples of the state of stiffness.

3. The system of claim 1, wherein a sample is drawn from the probability distribution of the state of stiffness for each corresponding values of the control input and the measurement.

4. The system of claim 1, wherein the control inputs include commands specifying values of one or combination of a steering angle of the wheels of the vehicle and a rotational velocity of the wheels, and wherein the measurements include values of one or combination of a rotation rate of the vehicle and an acceleration of the vehicle, and wherein the state trajectories include a sequence of states, each state includes a velocity and a heading rate of the vehicle, such that the motion model relates the value of the control inputs to a first value of the state of the vehicle through dynamics of the vehicle at consecutive time steps, and the measurement model relates the value of the measurement to a second value of the state of the vehicle at the same time step.

5. The system of claim 1, wherein the processor updates the probability distribution of the state of stiffness by
determining the error as a weighted differences between corresponding states of the first state trajectory of the vehicle and the second state trajectory of the vehicle;
adjusting the value of the sample of the probability distribution of the state of stiffness to reduce the error; and
updating the probability distribution of the state of stiffness to increase a probability of drawing the adjusted value of the sample from the updated probability distribution of the state of stiffness.

6. The system of claim 1, wherein the processor is configured for
determining a set of particles, each particle represents the first state trajectory determined with different sample drawn from the probability distribution of the state of stiffness;

comparing each particle from the set with the second trajectory to determine a weight of each particle representing an error between the particle and the second state trajectory; and determining the first state trajectory as a combination of the particles weighted according to the weights of each particle.

7. The system of claim 1, wherein the processor is configured for determining a set of initial first state trajectories corresponding to different samples drawn from the probability distribution of the state of stiffness;

comparing each initial first trajectory from the set with the second trajectory to determine a weight of each initial first state trajectory representing an error between the initial first state trajectory and the second state trajectory; and determining the first state trajectory as a combination of the initial state trajectories weighted according to the weights of each initial first state trajectory.

8. A method for calibrating a tire of a vehicle by estimating a state of stiffness of tires of the vehicle, the state of stiffness including at least one parameter defining an interaction of at least one tire of the vehicle with a road, wherein the method uses a processor coupled with stored instructions implementing the method, wherein the instructions, when executed by the processor carry out at least some steps of the method, comprising:

retrieving from a memory a motion model of the vehicle relating control inputs to the vehicle with a state of the vehicle and a measurement model of the vehicle relating measurements of the motion of the vehicle with the state of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defining disturbance on the motion of the vehicle;

receiving motion data indicative of the motion of the vehicle on the road according to a trajectory, wherein the motion data include a sequence of control inputs to the vehicle that moves the vehicle according to the trajectory and a sequence of measurements of the motion of the vehicle moved along the trajectory, and wherein the sequence of measurements corresponds to the sequence of control inputs;

updating iteratively a probability distribution of the state of stiffness until a termination condition is met, wherein an iteration determines a first state trajectory of the vehicle according to the motion model using the sequence of control inputs and one or multiple samples of the probability distribution of the state of stiffness, determines a second state trajectory of the vehicle according to the measurement model using the sequence of measurements, and updates the probability distribution of the state of stiffness to reduce an error between the first state trajectory of the vehicle and the second state trajectory of the vehicle; and rendering at least one or a combination of the probability distribution of the state of stiffness and a sample of the probability distribution of the state of stiffness when the termination condition is met.

9. The method of claim 8, wherein the measurement model of the vehicle includes a combination of a deterministic component of the measurement model independent from the state of stiffness and a probabilistic component of the measurement model that includes the state of stiffness, and wherein the second state trajectory is determined according to the measurement model using the sequence of measurements and the samples of the state of stiffness.

10. The method of claim 8, wherein a sample is drawn from the probability distribution of the state of stiffness for each corresponding values of the control input and the measurement.

11. The method of claim 8, wherein the control inputs include commands specifying values of one or combination of a steering angle of the wheels of the vehicle and a rotational velocity of the wheels, and wherein the measurements include values of one or combination of a rotation rate of the vehicle and an acceleration of the vehicle, and wherein the state trajectories include a sequence of states, each state includes a velocity and a heading rate of the vehicle, such that the motion model the value of the control inputs to a first value of the state of the vehicle through dynamics of the vehicle at consecutive time steps, and the measurement model relates the value of the measurement to a second value of the state of the vehicle at the same time step.

12. The method of claim 8, wherein the updating the probability distribution of the state of stiffness comprises:

determining the error as a weighted difference between corresponding states of the first state trajectory of the vehicle and the second state trajectory of the vehicle;

adjusting the value of the sample of the probability distribution of the state of stiffness to reduce the error; and updating the probability distribution of the state of stiffness to increase a probability of drawing the adjusted value of the sample from the updated probability distribution of the state of stiffness.

13. The method of claim 8, further comprising:

determining a set of particles, each particle represents the first state trajectory determined with different sample drawn from the probability distribution of the state of stiffness;

comparing each particle from the set with the second trajectory to determine a weight of each particle representing an error between the particle and the second state trajectory; and determining the first state trajectory as a combination of the particles weighted according to the weights of each particle.

14. The method of claim 8, further comprising:

determining a set of initial first state trajectories corresponding to different samples drawn from the probability distribution of the state of stiffness;

comparing each initial first trajectory from the set with the second trajectory to determine a weight of each initial first state trajectory representing an error between the initial first state trajectory and the second state trajectory; and determining the first state trajectory as a combination of the initial state trajectories weighted according to the weights of each initial first state trajectory.

15. A non-transitory computer readable storage medium embodied thereon a program executable by a processor for performing a method, the method comprising:

retrieving from a memory a motion model of the vehicle relating control inputs to the vehicle with a state of the vehicle and a measurement model of the vehicle relating measurements of the motion of the vehicle with the state of the vehicle, wherein the motion model of the vehicle includes a combination of a deterministic component of the motion and a probabilistic component of the motion, wherein the deterministic component of the motion is independent from the state of stiffness and defines the motion of the vehicle as a function of time, wherein the probabilistic component of the motion includes the state of stiffness having an uncertainty and defining disturbance on the motion of the vehicle;

receiving motion data indicative of the motion of the vehicle on the road according to a trajectory, wherein the motion data include a sequence of control inputs to the vehicle that moves the vehicle according to the trajectory and a sequence of measurements of the motion of the vehicle moved along the trajectory, and wherein the sequence of measurements corresponds to the sequence of control inputs;

updating iteratively a probability distribution of the state of stiffness until a termination condition is met, wherein an iteration determines a first state trajectory of the vehicle according to the motion model using the sequence of control inputs and one or multiple samples of the probability distribution of the state of stiffness, determines a second state trajectory of the vehicle according to the measurement model using the sequence of measurements, and updates the probability distribution of the state of stiffness to reduce an error between the first state trajectory of the vehicle and the second state trajectory of the vehicle; and rendering at least one or a combination of the probability distribution of the state of stiffness and a sample of the probability distribution of the state of stiffness when the termination condition is met.

* * * * *